(12) United States Patent
Wolf et al.

(10) Patent No.: US 6,494,418 B1
(45) Date of Patent: *Dec. 17, 2002

(54) WRIST REST ASSEMBLY

(75) Inventors: Robert J. Wolf, Woodbury; Thomas J. Barnidge, Burnsville; Wayne K. Darvell, North St. Paul; Kenneth J. Kirchhoff, Gem Lake, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/016,996

(22) Filed: Feb. 2, 1998

Related U.S. Application Data

(63) Continuation of application No. 08/597,323, filed on Feb. 6, 1996, now Pat. No. 5,713,544.

(51) Int. Cl.⁷ .................................................. B68G 5/00
(52) U.S. Cl. ...................................................... 248/118
(58) Field of Search .............................. 248/118, 118.1, 248/118.3, 118.5, 918; 400/715

(56) References Cited

U.S. PATENT DOCUMENTS 134,116 A    12/1872   West (List continued on next page.)

FOREIGN PATENT DOCUMENTS

GB         1268431      3/1972   ................ 260/28.5
GB         1541071      2/1979

OTHER PUBLICATIONS

Copy of Declaration of John Phillips –In the Matter of: CERTAIN GEL–FILLED WRIST RESTS AND PRODUCTS CONTAINING SAME; Inv. No. 337–TA–456; dated Dec. 15, 2001.

Copy of Declaration of Kurt D. Shouse –In the Matter of: CERTAIN GEL–FILLED WRIST RESTS AND PRODUCTS CONTAINING SAME; Inv. No. 337–TA–456; dated Dec. 18, 2001.

Copy of Declaration of Angela Stout –In the Matter of: CERTAIN GEL–FILLED WRIST RESTS AND PRODUCTS CONTAINING SAME; Inv. No. 337–TA–456; dated Dec. 18, 2001.

Copy of Declaration of Edward I. Stout, Ph. D. –In the Matter of: CERTAIN GEL–FILLED WRIST RESTS AND PRODUCTS CONTAINING SAME; Inv. No. 337–TA–456; dated Dec. 18, 2001.

*Primary Examiner*—Ramon O. Ramirez
(74) *Attorney, Agent, or Firm*—James L. Young; Peter L. Olson

(57) ABSTRACT

A wrist rest assembly for use along the front edge of a device to be operated by a person's hands or fingers, such as in front of a computer keyboard, including an elongate base on which is supported an elongate pad comprising a layer of gel within the covering. The pad has sufficient thickness between its top and bottom surfaces and width between its edges to afford supporting a users wrists on top surface with a portion of the layer of gel beneath and conforming to the supported wrists and to afford significant motion of the top surface of the pad with the supported wrists relative to the bottom surface in a plane generally parallel to the upper surface of the base. The base has a top portion supporting the pad, a bottom portion adapted to be supported on a horizontal surface; and structure that allows the top portion to be supported on the bottom portion with the top surface of the pad at a predetermined one of several different distances above that horizontal surface.

23 Claims, 5 Drawing Sheets

U.S. PATENT DOCUMENTS

| | | | |
|---|---|---|---|
| 793,756 A | 7/1905 | Williams | 248/118.5 |
| 2,694,026 A | 11/1954 | Johnson | |
| 2,720,660 A | 10/1955 | Smith | 5/337 |
| 3,020,260 A | 2/1962 | Nelson | 260/46.5 |
| 3,237,319 A | 3/1966 | Hanson | 36/2.5 |
| 3,237,619 A | 3/1966 | Kind et al. | 123/146.5 |
| 3,308,491 A | 3/1967 | Spence | 3/20 |
| 3,548,420 A | 12/1970 | Spence | 3/20 |
| 3,625,752 A | 12/1971 | Korpman | 117/122 |
| 3,663,973 A | 5/1972 | Spence | 5/348 |
| 3,676,387 A * | 7/1972 | Lindlof | 524/489 |
| 3,737,930 A | 6/1973 | Smith, III | 5/348 |
| 3,827,999 A | 8/1974 | Crossland | 260/33.6 |
| 3,858,379 A | 1/1975 | Graves et al. | 53/25 |
| 4,043,330 A | 8/1977 | Bansal | 128/133 |
| 4,108,954 A | 8/1978 | Hilterhaus et al. | 264/216 |
| 4,128,603 A | 12/1978 | Katchman et al. | 260/876 |
| 4,151,057 A | 4/1979 | St. Clair et al. | 204/159.17 |
| 4,160,754 A | 7/1979 | Schäpel et al. | 260/29.4 |
| 4,243,041 A | 1/1981 | Paul | 128/402 |
| 4,369,284 A | 1/1983 | Chen | 524/476 |
| 4,378,009 A | 3/1983 | Rowley et al. | 128/83 |
| 4,404,296 A | 9/1983 | Schäpel | 523/105 |
| 4,435,508 A | 3/1984 | Gabridge | 435/284 |
| 4,456,422 A | 6/1984 | Swayze | 414/744 |
| 4,456,642 A | 6/1984 | Burgdörfer et al. | 428/68 |
| 4,466,936 A | 8/1984 | Schäpel | 264/225 |
| 4,481,556 A | 11/1984 | Berke et al. | 361/222 |
| 4,482,063 A | 11/1984 | Berke et al. | 211/69.1 |
| 4,482,064 A | 11/1984 | Berke et al. | 211/69.1 |
| 4,483,634 A | 11/1984 | Frey et al. | 400/489 |
| 4,516,571 A | 5/1985 | Buchan | 128/132 |
| 4,545,554 A | 10/1985 | Latino et al. | 248/118.1 |
| 4,592,528 A | 6/1986 | Still | 248/359 |
| 4,621,781 A | 11/1986 | Springer | 248/118 |
| 4,661,099 A | 4/1987 | von Bittera et al. | 604/290 |
| 4,671,267 A | 6/1987 | Stout | 128/156 |
| 4,688,862 A | 8/1987 | Fowler et al. | 312/325 |
| 4,744,601 A | 5/1988 | Nakanishi | 297/391 |
| 4,753,241 A | 6/1988 | Brannigan et al. | 128/380 |
| 4,768,295 A | 9/1988 | Ito | 36/28 |
| 4,770,730 A | 9/1988 | Abe | 156/73.1 |
| 4,776,284 A | 10/1988 | McIntosh | 108/138 |
| 4,798,639 A | 1/1989 | Yamaguchi | 156/73.1 |
| 4,815,361 A | 3/1989 | Chiarella | 297/219 |
| 4,822,103 A | 4/1989 | Stenvall | 297/411 |
| 4,842,931 A | 6/1989 | Zook | 428/354 |
| 4,869,267 A | 9/1989 | Grim et al. | 128/80 |
| 4,887,326 A | 12/1989 | O'Brien et al. | 5/421 |
| 4,896,388 A | 1/1990 | Bard | 5/441 |
| 4,913,390 A | 4/1990 | Berke | 248/176 |
| 4,938,207 A | 7/1990 | Vargo | 128/80 |
| 4,964,402 A | 10/1990 | Grim et al. | 128/80 |
| 4,972,832 A | 11/1990 | Trapini et al. | 128/402 |
| 4,973,176 A * | 11/1990 | Dietrich | 400/715 |
| 4,993,409 A | 2/1991 | Grim | 128/78 |
| 4,999,068 A | 3/1991 | Chiarella | 156/78 |
| 5,020,852 A | 6/1991 | Marion | 297/200 |
| 5,027,801 A | 7/1991 | Grim | 128/80 |
| 5,034,998 A | 7/1991 | Kolsky | 2/2 |
| 5,050,596 A | 9/1991 | Walasek et al. | 128/381 |
| 5,050,826 A | 9/1991 | Johnston | 248/118 |
| 5,065,758 A | 11/1991 | Whitehead et al. | 128/402 |
| 5,076,758 A | 12/1991 | Palgrave | 415/214.1 |
| 5,082,720 A | 1/1992 | Hayes | 428/224 |
| 5,088,478 A | 2/1992 | Grim | 602/27 |
| 5,108,057 A | 4/1992 | Dandy, III et al. | 248/118 |
| 5,113,540 A | 5/1992 | Sereboff | 5/449 |
| 5,121,962 A | 6/1992 | Weber et al. | 297/214 |
| 5,125,606 A | 6/1992 | Cassano et al. | 248/118 |
| 5,129,391 A | 7/1992 | Brodsky et al. | 128/380 |
| 5,131,614 A | 7/1992 | Garcia et al. | 248/118 |
| 5,135,190 A | 8/1992 | Wilson | 248/118 |
| 5,136,646 A | 8/1992 | Haber et al. | 380/49 |
| 5,141,489 A | 8/1992 | Sereboff | 602/18 |
| 5,150,707 A | 9/1992 | Anderson | 128/402 |
| 5,158,255 A | 10/1992 | Fuller | 248/118 |
| 5,158,256 A | 10/1992 | Gross | 248/118 |
| 5,159,717 A | 11/1992 | Drew et al. | 2/20 |
| 5,163,646 A * | 11/1992 | Engelhardt | 248/118 |
| 5,169,360 A | 12/1992 | Saunders | 482/52 |
| 5,170,971 A | 12/1992 | Schaeffer et al. | 248/118 |
| 5,173,963 A | 12/1992 | Greenberg | 2/20 |
| 5,173,979 A | 12/1992 | Nennhaus | 5/648 |
| 5,183,230 A | 2/1993 | Walker et al. | 248/118 |
| 5,191,752 A | 3/1993 | Murphy | 54/44.5 |
| 5,193,925 A | 3/1993 | Foulke | 400/715 |
| 5,197,699 A | 3/1993 | Smith et al. | 248/118 |
| 5,213,554 A | 5/1993 | Goldstein et al. | 482/52 |
| 5,219,136 A | 6/1993 | Hassel et al. | 248/118 |
| 5,228,655 A | 7/1993 | Garcia et al. | 248/118 |
| 5,242,139 A | 9/1993 | Aldrich | 248/119 |
| 5,262,468 A | 11/1993 | Chen | 524/476 |
| 5,330,249 A | 7/1994 | Weber et al. | 297/214 |
| 5,338,289 A | 8/1994 | Cooker | 602/19 |
| 5,346,164 A | 9/1994 | Allen | 248/118 |
| 5,348,408 A | 9/1994 | Gelardi et al. | 400/715 |
| 5,350,418 A | 9/1994 | Janevski et al. | 607/111 |
| 5,352,168 A | 10/1994 | Wilkinson | 482/55 |
| 5,356,099 A * | 10/1994 | Sereboff | 248/118.1 |
| 5,358,203 A | 10/1994 | Smith et al. | 248/118 |
| 5,362,834 A | 11/1994 | Schäpel et al. | 528/58 |
| 5,363,631 A | 11/1994 | Garrison | 54/66 |
| 5,374,018 A | 12/1994 | Daneshvar | 248/118 |
| 5,386,956 A | 2/1995 | Hatcher | 248/118 |
| 5,407,156 A | 4/1995 | Rossman et al. | 248/118.1 |
| 5,421,543 A | 6/1995 | Rossman et al. | 248/118.3 |
| 5,433,407 A | 7/1995 | Rice | 248/118.1 |
| 5,435,508 A | 7/1995 | Deuitch et al. | 248/118 |
| 5,439,963 A | 8/1995 | Korpman | 524/271 |
| 5,443,237 A | 8/1995 | Stadtmauer | 248/441.1 |
| 5,445,858 A | 8/1995 | Nwoko | 428/71 |
| 5,467,952 A | 11/1995 | Martin | 248/118.1 |
| 5,470,036 A | 11/1995 | Vu et al. | 248/118.5 |
| 5,475,882 A | 12/1995 | Sereboff | 3/450 |
| 5,476,491 A | 12/1995 | Mayn | 607/111 |
| 5,492,291 A | 2/1996 | Otani | 248/118 |
| 5,507,458 A | 4/1996 | Campbell et al. | 248/118.3 |
| 5,512,400 A | 5/1996 | Turner | 5/451 |
| 5,513,824 A * | 5/1996 | Leavitt et al. | 248/118.3 |
| 5,547,154 A * | 8/1996 | Kirchhoff et al. | 248/118.3 |
| 5,555,584 A | 9/1996 | Moore, III et al. | 12/142 |
| 5,562,270 A | 10/1996 | Montague | 248/118.1 |
| 5,566,913 A | 10/1996 | Prokop | 248/118 |
| 5,568,907 A | 10/1996 | Wolfe et al. | 248/118 |
| 5,590,430 A | 1/1997 | Sereboff | 5/655.5 |
| 5,593,769 A | 1/1997 | Wolf et al. | 428/286 |
| 5,601,364 A | 2/1997 | Ume | 374/57 |
| 5,633,286 A | 5/1997 | Chen | 524/474 |
| 5,641,369 A * | 6/1997 | Kirchhoff et al. | 156/73.1 |
| 5,667,895 A | 9/1997 | Jenkner | 428/424.4 |
| 5,669,797 A | 9/1997 | Wolf et al. | 442/329 |
| 5,679,193 A | 10/1997 | Yates | 156/145 |
| 5,689,253 A | 11/1997 | Hargreaves et al. | 341/22 |
| 5,710,206 A | 1/1998 | Fancis et al. | 524/505 |

| | | | | | |
|---|---|---|---|---|---|
| 5,730,711 A | * | 3/1998 | Kendall et al. | ......... | 248/118 X |
| 5,803,416 A | * | 9/1998 | Hanson et al. | .............. | 248/118 |
| 5,865,180 A | | 2/1999 | Sigfrid | ....................... | 128/845 |
| 5,932,046 A | * | 8/1999 | Yates | ........................ | 156/145 |
| 5,980,143 A | * | 11/1999 | Bayer et al. | ................ | 400/715 |
| 6,050,964 A | * | 4/2000 | Yates | .................... | 248/118 X |
| 6,089,516 A | | 7/2000 | Yates | ........................ | 248/118 |
| 6,110,134 A | | 8/2000 | Clark, Jr. et al. | ............... | 602/6 |
| 6,216,988 B1 | | 4/2001 | Hsu et al. | .................. | 248/118 |

\* cited by examiner

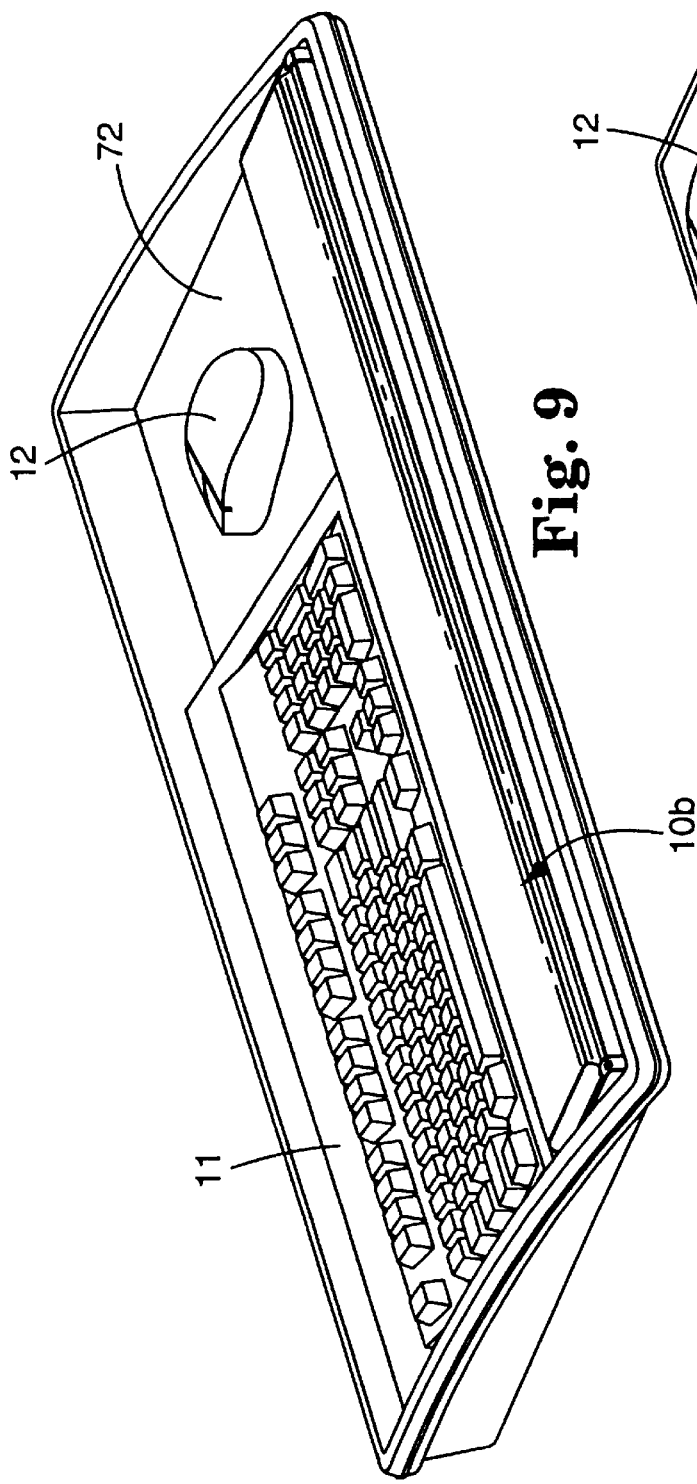
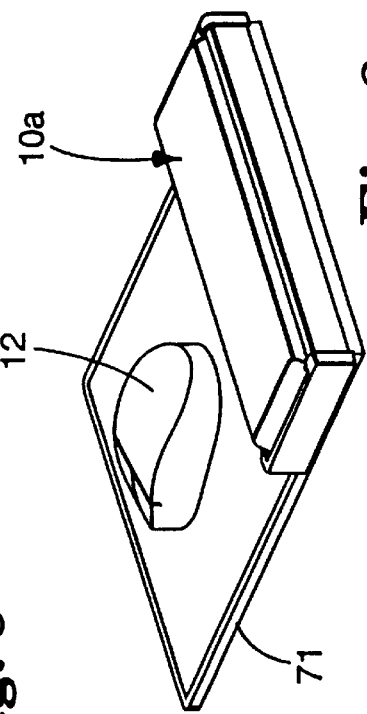

WRIST REST ASSEMBLY

This application is a continuation of Ser. No. 08/597,323 filed Feb. 6, 1996 U.S. Pat. No. 5,713,544.

TECHNICAL FIELD

The present invention relates to wrist rest assemblies for use along the front edges of devices to be operated by a person's hands or fingers, such as in front of a computer keyboard, computer mouse or other input device.

BACKGROUND ART

Wrist rest assemblies are known for use along the front-edge of a device to be operated by a person's hands or fingers, such as in front of a computer key board, computer mouse or other input device. It has been suggested that the use of such wrist rest assemblies can restrict damage to wrists from prolonged use of such devices. Heretofore, however, known wrist rest assemblies have been formed with layers of cushioning material that do not provide the quality of support for the wrists that may be desired.

DISCLOSURE OF INVENTION

The present invention provides a wrist rest assembly for use along the front edge of a device to be operated by a person's hands or fingers, such as in front of a computer key board, computer mouse or other input device, which wrist rest assembly provides a layer of cushioning material that can provide better support for the wrists than has heretofore been provided, and further affords a degree of movement of the supported wrist relative to the surface on which the wrist rest is supported that has not been provided by known prior art wrist rest assemblies.

According to the present invention there is provided a wrist rest assembly comprising (1) a base having an upper pad support surface, which base has a bottom or supported surface adapted to be supported on a horizontal surface along the front edge of the device; and (2) a pad comprising a layer of gel. A bottom surface of the elongate pad is supported on the upper pad support surface of the base, and the pad has a sufficient width between its edges and thickness between it. top and bottom surfaces (e.g., a thickness in the range of about ⅛ inch to 5 inches and a width in the range of about ½ to 10 inches with the larger widths providing both wrist and fore arm support) to afford supporting a users wrists on the top surface to help keep the wrists in a neutral position with a portion of the layer of gel beneath and conforming to the supported wrists to distribute the weight of the wrists over a wide area and affording significant motion of the top surface of the pad with the supported wrists relative to the bottom surface in a plane generally parallel to the upper surface of the base.

Preferably the gel is a stable elastomeric block polymer gel similar to the gel described in U.S. Pat. No. 3,676,387 where the gels are polymer-oil combinations. The polymers are the A-B-A configurations wherein each block A is a glassy or resinous non-elastomeric thermoplastic polymer block with a glass transition temperature above room temperature, i.e., 25° C., having an average molecular weight of between about 2,000 and 100,000 and which is relatively incompatible with the elastomeric polymer block B. B is an elastomeric block polymer of a conjugated diene, the average molecular weight between about 15,000 and 1,000,000 (preferably 15,000 to 250,000) and having a glass transition temperature considerably between that of blocks A. This difference in glass transition temperature may be as small as 15° C., but is preferably at least 100° C. and more preferably at least about 125° C. The end blocks A of the block copolymer should constitute approximately 10 to 50 percent of the total polymer weight. Such block polymers and a method for their formation, are described in the U.S. Pat. No. 3,265,765 (Holden et al.) issued Aug. 9, 1966, and in general, these are quite suitable in the practice of the present invention.

Elastomeric block copolymers of the type useful in the practice of this invention have been combined with oils to make oil extended rubbers and adhesives. In the formation of adhesives, the amount of oil is generally greater than in oil extended rubbers. The formation of adhesive compositions containing such block polymer tackilying resin and oil is described in U.S. Pat. No. 3,239,478 (Harlan, Jr.) issued Mar. 8, 1966. However, in none of the rubbers or adhesives just described does the amount of oil (compatible plasticizing oil) used constitute ordinarily even as much as 67 percent of the total composition, in as much as extension beyond this point will result in an adhesive with little or no cohesive strength. Further the oils recommended in Harlan are at least partially aromatic and such aromaticity results in a soft flowable material where large percentages of oil are used for the plasticizing effect. The use of a compatible oil is nonacceptable for purposes of the non-acceptable invention.

When an elastomeric block copolymer of the kind noted herein is combined with a non-aromatic paraffinic oil of low volatility with a flash point about 350° F. and below about 500° F., wherein the oil constitutes at least about 70 percent of the total weight of the block polymer-oil elastoplastic mixture, an extremely highly elastic material is obtained which is not only useful as such but which is capable of being melted upon heating for casting in the formation of molded or other articles at room temperatures. Stable elastomeric materials can be formed where the oil constitutes as much as 95 percent of the combined weight of the oil and elastomeric block copolymer. When the amount of the oil is less than about 70 percent the melt viscosity becomes excessive for convenient casting from a hot melt system. When the amount of oil is greater than about 95 percent, a thixotropic liquid results.

Paraffinic oils, which are normally considered incompatible with block polymers or other rubbers, and thus, not considered extender oils, are somewhat compatible with block copolymers at elevated temperatures (i.e., about 300° F.) to the extent that the oil and the block copolymer form a mixture which when cooled, exhibits a novel structure which is neither gel nor extended polymer, but is rather a continuous web of one-dimensional polymer strands intermingled with a continuous phase of non-compatible oil. Microscopic examination of the oil polymer mixture reveals a sponge-like construction having voids therein filled with oil. The oil may be removed by mechanical means such as pressing, filtering, etc.

The oil used must be incompatible (non-solvent) with the non-elastomeric, thermoplastic polymer block A, should be of low volatility and should have a boiling point in excess of the melting temperature of the polymer-oil combination. For this purpose, ordinary paraffin-based petroleum oils such as mineral oil, petroleum and other paraffin liquid petroleum products within the viscosity range of products commonly called oils are suitable in the practice of this invention. Unsuitable for purposes of the present invention are aromatic, naphthenic and cyclic containing oils.

Preferably, the gel is the gel described in Example No. II of British Patent No. GB 1,268,431 (which states "A mixture of a parts "Nujol" (Registered Trade Mark) brand U.S.P. mineral oil and one part styrene-isoprene-styrene block copolymer ("Kraton 107") was heated to approximately 149 degrees C. and agitated vigorously until the polymer appeared visually dissolved. Empty pint bottles were dipped into this hot sol so that a layer approximately 1.59 mm thick was desposited on the bottom rim. These bottles could be filled with water and dropped repeatedly onto the concrete floor or steel plates without breakage.")". except that the ratio of oil to block copolymer is in the range of 4 to 1 to 10 to 1 rather than being 5 to 1 as is described in that Example No. II. That gel is quite similar to the gel in the pad commercially available from Minnesota Mining and Manufacturing Company, St. Paul, Minn., under the trade designation "RESTON (T.M.) Flotation Pad", which pad for many years has been used in beds, wheel chairs and the like to prevent pressure points. Also, preferably the gel has a covering comprising an elongate tubular layer of flexible polymeric material (e.g., polyurethane) around the gel, which tubular layer has sealed ends to retain the gel and provides a flexible barrier to the escape of mineral oil from within the gel. The pad assembly can further include an outer layer over the top surface of the pad of a soft conformable material adapted for comfortable contact with a users wrists.

Preferably the base comprises a top portion having the upper pad support surface supporting the bottom surface of the elongate pad; a bottom portion having the bottom supported surface adapted to be supported on a horizontal surface; and means for supporting the top portion on the bottom portion with the elongate pad at a predetermined one of several different distances above the supported surface. That means is provided by the top portion of the base comprising longitudinally extending rails projecting outwardly in opposite directions generally parallel to its upper pad support surface, and the bottom portion including generally parallel spaced vertically upwardly projecting support portions having opposed surfaces defining sets of grooves parallel to the supported surface and vertically spaced along the support portions, each of which sets of grooves is adapted to receive the rails to support the top portion with the top surface of the elongate pad at a different distance above the supported surface depending on which set of grooves the rails are engaged in.

While there might be advantages for some applications in allowing the top portion to reciprocate along the grooves of the bottom portion, thereby affording large transverse movements of the wrists with the top portion without relocating the wrists along the top surface of the pad; as illustrated the assembly includes means for releasably fixing the top portion relative to the bottom portions with corresponding ends of the top and bottom portions generally in alignment.

While the wrist rest assembly including its base is very useful, the base is not a necessity to using the pad. Thus generally the method according to the present invention for supporting the wrists of a person operating a device such as a computer keyboard, computer mouse or other input device comprises: (1) providing a pad comprising a layer of gel, which pad has opposite top and bottom surfaces, and opposite longitudinally extending edges; (2) supporting the pad along the front edge of the device; and (3) supporting the users wrists along the top surface of pad; the pad having a sufficient thickness between the top and bottom surfaces and width between the edges to have a portion of the layer of gel beneath and conforming to the supported wrists and to afford significant motion of the top surface of the pad with the supported wrists relative to the bottom surface in a horizontal plane.

In one embodiment, the invention is a wrist rest assembly which comprises a stable elastomeric block polymer gel layer, a rigid base, a support layer and a flexible cover layer. The gel layer is elongated longitudinally and has opposite longitudinally extending edges, opposite longitudinally spaced ends, a top surface for supporting a user's wrists, a bottom surface opposite the top surface, and a thickness between the top surface and the bottom surface. The gel layer extends between ends for a gel length and between edges for a gel width. The rigid base has a generally flat support surface extending the gel length and gel width for supporting the gel layer. The base has longitudinally extending edge supports projecting upwardly from the support surface to a common height along the entire extent of each edge support. The edge supports extend adjacent the edges of the gel layer. The base further includes end supports which extend upwardly from the support surface adjacent the ends of the gel layer to terminate at a height. The end supports are removably secured relatively to the support surface. The support layer extends between the bottom surface of the gel layer and the support surface of the base. The flexible cover layer extends over the gel layer and is secured to the support layer, with the cover layer and support layer sealed together adjacent the ends of the gel layer. The top surface of the gel layer and the cover layer thereon extend above the common height of the edge supports and above the height of the ends supports. The gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane. Such motion allows the user's wrists to move in any direction in a generally circular area having a diameter of at least one-half inch.

In one embodiment, the invention is a wrist rest assembly which comprises a stable elastomeric block polymer gel layer, a rigid base, a support layer, a flexible cover layer and an outer layer. The gel layer is elongated longitudinally and has opposite longitudinally extending edges, opposite longitudinally spaced ends, a top surface for supporting a user's wrists, a bottom surface opposite the top surface, and a thickness between the top surface and the bottom surface. The gel layer extends between ends for a gel length and between edges for a gel width. The rigid base has a generally flat support surface extending the gel length and gel width for supporting the gel layer. The base has longitudinally extending edge supports projecting upwardly from the support surface to a common height along the entire extent of each edge support. The edge supports extend adjacent the edges of the gel layer. The support layer extends between the bottom surface of the gel layer and the support surface of the base. The flexible cover layer extends over the gel layer and is secured to the support layer, with the cover layer and support layer sealed together adjacent the ends of the gel layer. The outer layer is secured to the support layer to flexibly cover the top surface of the gel layer. The top surface of the gel layer and the cover layer thereon extend above the height of the edge supports. The gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane. Such motion allows the user's wrists to move in any direction in a generally circular area having a diameter of at least one-half inch.

In one embodiment, the invention is a wrist rest assembly which comprises a stable elastomeric block polymer gel layer, a rigid base, a support layer and a flexible cover layer. The gel layer is elongated longitudinally and has opposite longitudinally extending edges, opposite longitudinally spaced ends, a top surface for supporting a user's wrists, a bottom surface opposite the top surface, and thickness between the top surface and the bottom surface. The gel layer extends between ends for a gel length and between edges for a gel width. The rigid base has a generally flat support surface extending the gel length and gel width for supporting the gel layer. The base has longitudinally extending edge supports projecting upwardly from the support surface to a common height along the entire extent of each edge support. The edge supports extend adjacent the edges of the gel layer. The base has a top portion and a bottom portion. The top portion includes the support surface and edge supports thereon. The base further comprises a pair of longitudinally extending rails on the top portion, and a pair of upwardly projecting support portions on the bottom portion. The upwardly projecting support portions have a plurality of vertically spaced sets of grooves thereon, and each set of grooves is adapted to slidably receive the rails therein. The support layer extends between the bottom surface of the gel layer and the support surface of the base. The flexible cover layer extends over the gel layer and is secured to the support layer, with the cover layer and support layer sealed together adjacent the ends of the gel layer. The top surface of the gel layer and the cover layer thereon extend above the height of the edge supports. The gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane. Such motion allows the user's wrists to move in any direction in a generally circular area having a diameter of at least one-half inch.

In one embodiment, the present invention is a wrist rest assembly which comprises an elastomeric polymer gel layer, a base, a support layer and a flexible cover layer. The gel layer is elongated longitudinally and has longitudinally extending edges, a top surface for supporting a user's wrists, a bottom surface opposite the top surface, and a thickness between the top surface and the bottom surface. The gel layer extends between the edges for a gel width. The base has a generally flat support surface for supporting the gel layer along the bottom surface thereof, and the base has a top portion and a bottom portion. The top portion of the base includes the support surface, and the base further comprises a pair of longitudinally extending rails on the top portion, and a pair of upwardly projecting support portions on the bottom portion. The upwardly projecting support portions have a plurality of vertically spaced sets of grooves thereon, and each set of grooves is adapted to slidably receive the rails therein. The support layer extends between the bottom surface of the gel layer and the support surface of the base. The flexible cover layer extends over the gel layer and is secured to the support layer to retain the gel layer therein. The gel layer has a sufficient thickness between the top and bottom surfaces thereof and a sufficient width between the edges thereof to have a portion of the gel layer beneath and conforming to the user's wrist supported on the top surface thereof and to afford motion of the top surface of the gel layer with the user's supported wrist relative to the bottom surface of the gel layer in a plane generally parallel to the support surface. Such motion allows the user's supported wrist to move in any direction in a generally circular area having a diameter of at least one-half inch.

In one embodiment, the present invention is a wrist rest comprising a non-liquid elastomeric polymer gel layer and a base. The gel layer is elongated longitudinally and has opposed, spaced apart side edges to define a gel layer width therebetween, a top surface for supporting a user's wrist, and a bottom surface spaced from the top surface to define a gel layer thickness therebetween. The width and thickness of the gel layer are sufficient to have a portion of the gel layer beneath and conforming to the user's wrist supported on the top surface thereof and to afford motion of the top surface of the gel layer with the user's supported wrist relative to the bottom surface of the gel layer in a plane generally parallel to the support surface. Such motion allows the user's supported wrist to move in any direction in a generally circular area having a diameter of at least one-half inch. The base supports the gel layer along the bottom surface thereof, and has a top portion and a bottom portion. The base has a generally flat support surface on the top portion thereof for supporting the gel layer along the bottom surface of the gel layer. The base also has a pair of longitudinally extending rails on the top portion and a pair of upwardly projecting support portions on the bottom portion. The upwardly projecting support portions have a plurality of vertically spaced sets of grooves thereon, and each set of grooves is adapted to slidably receive the rails therein.

In one embodiment, the present invention is a wrist rest assembly which comprises a pad assembly having an upper portion and a lower portion, and a base. The upper portion includes a non-liquid elastomeric polymer gel layer. The gel layer is elongated longitudinally and has longitudinally extending side edges, laterally extending end edges, a top surface for supporting a user's wrist and a bottom surface. The gel layer extends between the longitudinal edges for a gel width, extends between the lateral edges for a gel length, and has sufficient thickness between its top and bottom surfaces and a sufficient gel width to have a portion of the gel layer beneath and conforming to the user's wrist supported on the top surface thereof. The gel layer affords motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch. The lower portion has a top surface and a bottom surface. The top surface of the lower portion supports the bottom surface of the gel layer and the bottom surface of the lower portion is the bottom surface of the pad assembly. The lower portion has a width and a length generally conforming with the gel width and the gel length, respectively. The lower portion of the pad assembly is less compressible than the upper portion thereof. The lower portion has edge sections extending along the bottom surface thereof laterally beyond the longitudinally extending side edges of the gel layer. The base has a generally flat support surface for supporting the pad assembly along the bottom surface of the lower portion thereof and longitudinally extending edge supports projecting upwardly from the support surface to a common height along and above the entire extent of each edge section of the lower portion of the pad assembly.

In one embodiment, the invention is an improvement in a wrist rest assembly of the type having an elongated resilient pad which has a cover thereon and which is supported by and separable from an elongate pad mounting structure. In the improved wrist rest assembly, the resilient pad has an upper pad portion and a lower pad support portion. The upper pad portion includes a non-liquid elastomeric polymer gel layer. The gel layer is elongated longitudinally and has longitudinally extending side edges, laterally extending end edges, a top surface for supporting a user's wrist and a bottom surface. The gel layer extends between the longitudinal edges to define a gel width, extends between the lateral edges to define a gel length, and has a sufficient thickness between its top and bottom surfaces and a sufficient gel width to have a portion of the gel layer beneath and conforming to the user's wrist supported on the top surface thereof. The gel layer affords motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch. The lower pad support portion has a top surface and a bottom surface. The top surface of the lower pad support portion supports the bottom surface of the gel layer and the bottom surface of the lower pad support portion is the bottom surface of the resilient pad. A lower pad support portion has a width and a length generally conforming with the gel width and the gel length, respectively. The lower pad support portion has edge sections extending laterally beyond the longitudinally extending side edges of the gel layer. In the improved wrist rest assembly, the elongated pad mounting structure has a support surface for supporting the resilient pad along the bottom surface of the lower pad support portion thereof and longitudinally extending edge supports projecting upwardly from the support surface to a common height along and higher than the entire extent of each edge section of the lower pad support portion of the resilient pad. The elongated pad mounting structure is in engagement with only the lower pad support portion of the resilient pad.

In one embodiment, the invention is an improvement in a wrist rest assembly of the type having an elongated resilient pad which has a cover thereon and which is supported by and separable from an elongated pad mounting structure. In the improved wrist rest assembly, the resilient pad has an upper pad portion and a lower pad support portion. The upper pad portion includes a non-liquid elastomeric polymer gel layer. The gel layer is elongated longitudinally and has longitudinally extending side edges, laterally extending end edges, a top surface for supporting a user's wrist and a bottom surface. The gel layer extends between the longitudinal edges to define a gel width, extends between the lateral edges to define a gel length, and has a sufficient thickness between its top and bottom surfaces and a sufficient gel width to have a portion of the gel layer beneath and conforming to the user's wrist supported on the top surface thereof. The gel layer affords motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch. The lower pad support portion has a top surface and a bottom surface. The top surface of the lower pad support portion supports the bottom surface of the gel layer and the bottom surface of the lower pad support portion is the bottom surface of the resilient pad. The lower pad support portion has a width and a length generally conforming with the gel width and the gel length, respectively. The lower pad support portion has edge sections extending laterally beyond the longitudinally extending side edges of the gel layer. In the improved wrist rest assembly, the elongated pad mounting structure has a support surface for supporting the resilient pad along the bottom surface of the lower pad support portion thereof. The elongated pad mounting structure has longitudinally extending edge supports projecting upwardly from the support surface to a common height along and higher than the entire extent of each edge section of the lower pad support portion of the resilient pad. The elongated pad mounting structure has laterally extending ends aligned to extend above the support surface adjacent the end edges of the upper pad portion, with each end having no portion thereof extending over any part of the upper pad portion of the resilient pad and the cover thereon. The elongated pad mounting structure is in engagement with only the lower pad support portion of the resilient pad.

In one embodiment, the present invention is an improvement in a wrist rest of the type having an elongated resilient pad, wherein the resilient pad includes a layer of cushioning material with a cover thereover, and wherein the resilient pad is placed on a horizontal surface adjacent an input device to be operated by a person's hand or fingers. In the improved wrist rest assembly, the resilient pad has an upper pad portion and a lower pad support portion. The upper pad portion includes the cover, and the cushioning material is defined as a non-liquid elastomeric polymer gel layer. The gel layer is elongated longitudinally and has longitudinally extending side edges, laterally extending end edges, a top surface for supporting the cover which engages a user's wrist and a bottom surface. The gel layer extends between the longitudinal edges to define a gel width, extends between the lateral edges to define a gel length, and has sufficient thickness between its top and bottom surfaces and a sufficient gel width to have a portion of the gel layer beneath and conforming to the user's wrist supported by the cover on the top surface thereof. The gel layer affords motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch. The lower pad support portion has a top surface and a bottom surface. The top surface of the lower pad support portion supports the bottom surface of the gel layer and the bottom surface of the lower pad support portion is the bottom surface of the resilient pad. The lower pad support portion has a width and a length generally conforming with the gel width and the gel length, respectively. The lower pad support portion has edge sections extending laterally beyond the longitudinally extending side edges of the gel layer.

In one embodiment, the invention is an improvement in a wrist rest of the type having an elongated resilient pad, wherein the resilient pad includes a layer of cushioning material with a cover thereover, and wherein the resilient pad is placed on a horizontal surface adjacent an input device to be operated by a person's hand or fingers. In the improved wrist rest assembly, the resilient pad has an upper pad portion and a lower pad support portion. The upper pad portion includes the cover, and the cushioning material is defined as a non-liquid elastomeric polymer gel layer. The gel layer is elongated longitudinally and has longitudinally extending side edges, laterally extending end edges, a top surface for supporting the cover which engages a user's wrist and a bottom surface. The gel layer extends between the longitudinal edges to define a gel width, extends between the lateral edges to define a gel length, and has a sufficient thickness between its top and bottom surfaces and a sufficient gel width to have a portion of the gel layer beneath and conforming to the user's wrist supported by the cover on the top surface thereof. The gel layer affords motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch. The lower pad support portion has a top surface and a bottom surface. The top surface of the lower pad support portion supports the bottom surface of the gel layer and the bottom surface of the lower pad support portion is the bottom surface of the resilient pad. The lower pad support portion has a width and a length generally conforming with the gel width and the gel length, respectively. The lower pad support portion of the resilient pad is less compressible than the upper pad portion thereof. The lower pad support portion has edge sections extending laterally beyond the longitudinally extending side edges of the gel layer.

BRIEF DESCRIPTION OF THE DRAWING

The present invention will be further described with reference to the accompanying drawing wherein like reference numerals refer to like parts in the several views, and wherein:

FIGS. 7, 8 and 9 illustrate uses of the wrist rest assembly of FIG. 1 or a shortened or lengthened version thereof.

DETAILED DESCRIPTION OF THE PREFERRED EMBODIMENT

Figure 5:
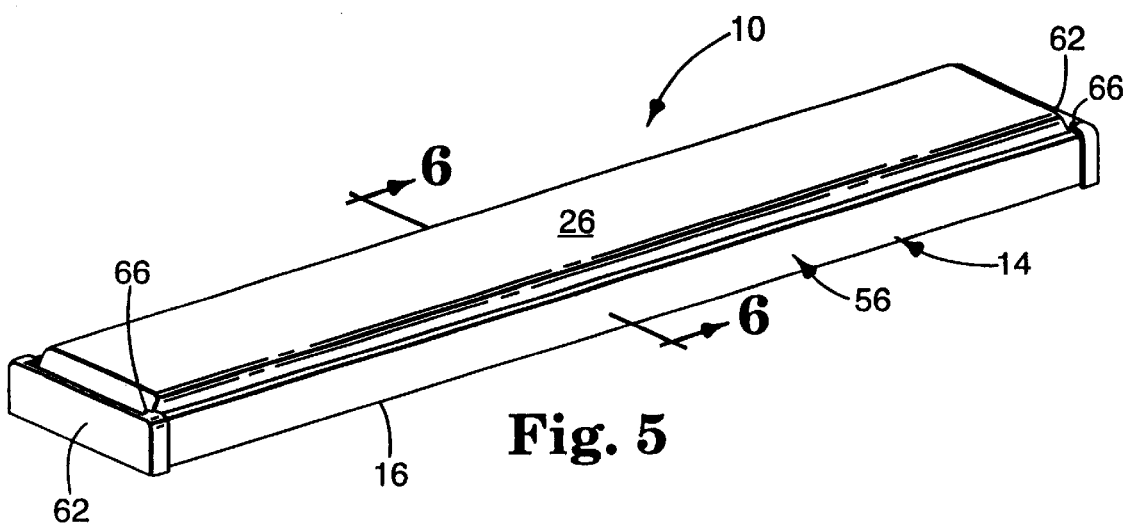
Figure 7:
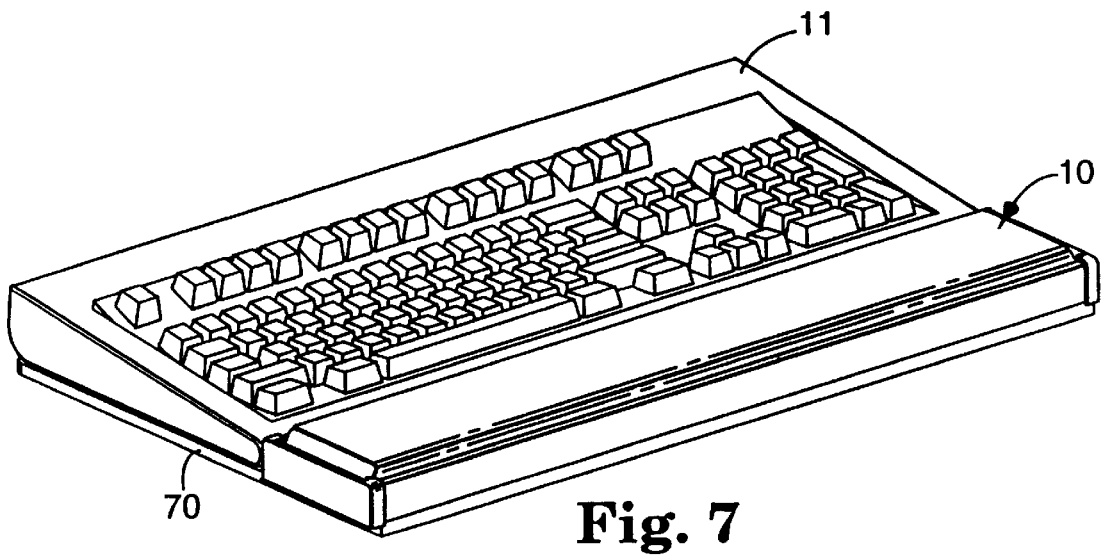

Referring now to FIG. 5 of the drawing there is illustrated a wrist rest assembly according to the present invention, generally designated by the reference numeral 10. The wrist rest assembly 10 is adapted for use along the front edge of a device to be operated by a person's hands or fingers, such as in front of a computer keyboard 11 as is illustrated in FIG. 7 or in front of a computer mouse 12 as is illustrated in FIG. 8 with a shortened version 10a thereof, or in front of a computer keyboard 11 and mouse 12 as is illustrated in FIG. 9 with an extended version 10b thereof, to provide support for the wrists of a person using the keyboard 11 and/or mouse 12.

Generally, the wrist rest assembly 10 comprises (1) an elongate base 14 having an elongate upper pad support surface 15 (see FIG. 6), which base 14 has a bottom supported surface 16 generally parallel to its upper pad support surface 15 adapted to be supported on a horizontal surface along the front edge of the device 11 or 12; and (2) an elongate pad 17 comprising a covering 18 and a layer of gel 19 within the covering 18. The pad 17, which is shown separated from the base 14 in FIG. 1, has opposite top and bottom surfaces 20 and 21, opposite longitudinally extending edges 22, and opposite ends 24. The bottom surface 21 of the elongate pad 17 is supported on and can be adhered to the upper pad support surface 15 of the base 14, and the pad 17 has a sufficient thickness between its top and bottom surfaces 20 and 21 and sufficient width between its edges 22 to afford supporting a users wrists along its top surface 20 with a portion of the layer of gel 19 beneath and conforming to the supported wrists and affording significant motion of the top surface 20 of the pad with the supported wrists relative to its bottom surface 21 in a plane generally parallel to the upper surface 15 of the base 14. As an example, when the gel 19 is that gel described in Example No. II in British Patent No. GB 1,268,431 except that the ratio of oil to block copolymer is 6 to 1 rather than being 5 to 1 as is described in that Example No. 3; the layer of that gel 19 has a thickness of about ⅜ inch and a width between the edges of the pad 17 of about 2.9 inches; and the covering 18 is of 0.002 inch thick polyurethane; that motion of the top surface 20 of the pad with a supported wrist relative to its bottom surface 21 in a plane generally parallel to the supported surface 16 of the base 14 allows the supported wrist and the users hand to move in any direction in a generally circular area having a diameter of about one inch. The area of such movement could be made larger or smaller by using different gel compositions, but for most embodiments of the wrist rest should be a circular area having a diameter of at least ½ inch.

FIGS. 1 through 4 sequentially illustrate the assembly of the wrist rest assembly 10 and certain details about its structure.

Figure 1:
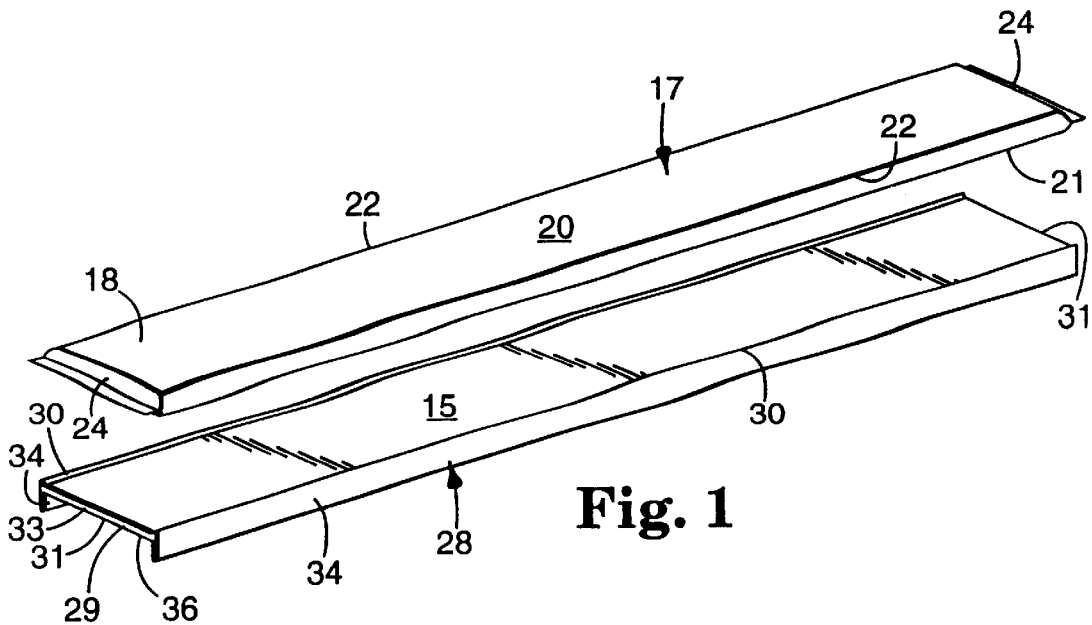
FIGS. 1 through 5 are perspective views sequentially illustrating the assembly of a wrist rest assembly according to the present invention.
Figure 2:
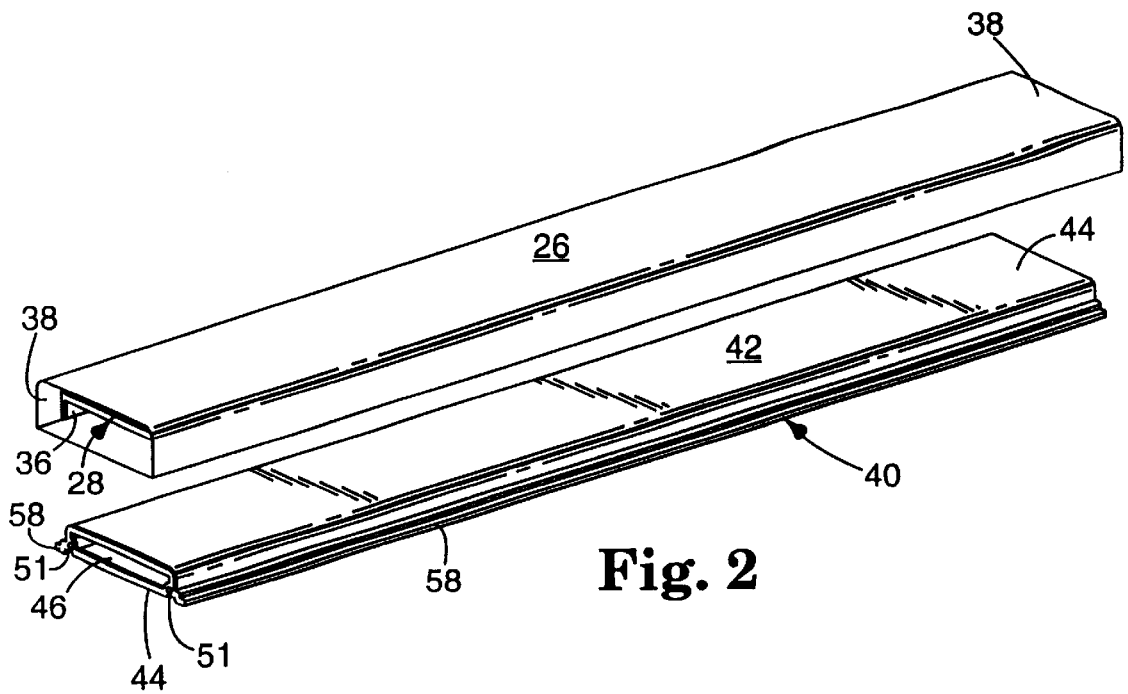

The covering 18 of the pad 17, best seen in FIG. 1, is an elongate tubular layer of a flexible polymeric material (e.g., 0.001 to 0.003 inch thick polyurethane) around the gel 19 which is sealed at the ends 24 of the pad 17 (e.g., by heat sealing) to retain the gel 19 within the tubular layer and provide a flexible barrier to the escape of mineral oil or other liquids from within the gel 19.

As is illustrated in FIGS. 2 through 6, the assembly 10 further includes an outer layer 26 over the top surface 20 of the pad 17 adapted for comfortable contact with a users wrists. That outer layer 26 can, for example, be made of a soft conformable non-woven polyurethane material, or of other materials such as leather, vinyl, or the material commercially designated "Dacron" (T.M.) sold by DuPont, Wilmington, Del., or the material commercially designated "Ultrilure" (R.T.M.).

Figure 6:
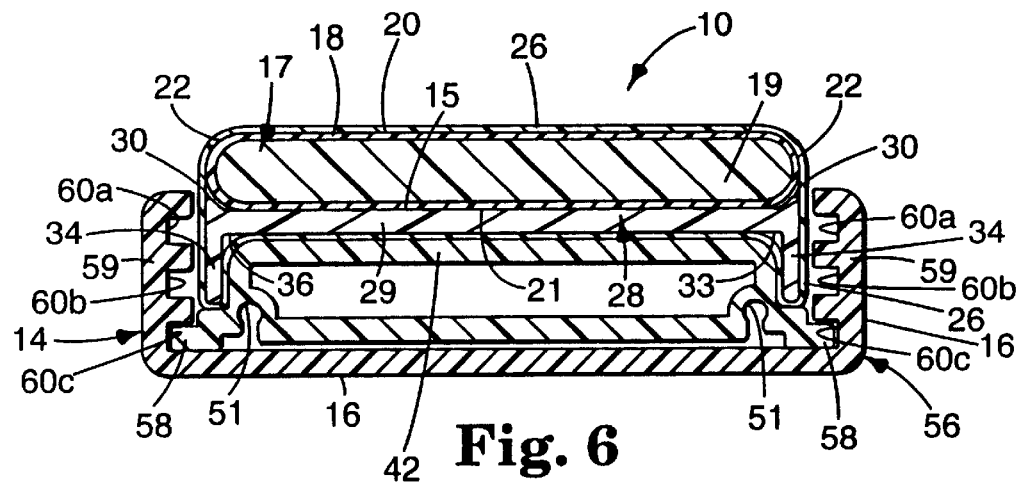
FIG. 6 is an enlarged sectional view taken approximately along lines 6—6 of FIG. 5.

The wrist rest assembly 10 tensions the outer layer 26 over the top surface 20 of the pad 17. As is best seen in FIGS. 1 and 6, the base 14 includes an elongate support plate 28 (e.g., an extrusion of rigid polyvinyl chloride or polystyrene) including a generally plate-like top portion 29 having opposite sides 30, opposite ends 31, the generally planer upper pad support surface 15, and an opposite bottom surface 33. The support plate 28 also includes plate like side portions 34 along the opposite sides of the top portion 29 and extending away from the bottom surface 33 of the top portion 29 to form with the top portion 29 an elongate recess 36. The pad 17 is supported along the upper pad support surface 15 of the support plate 28; and the outer layer 26 is in the form of a elongate sleeve having opposite end portions 38 and extends around the elongate support plate 28 and the elongate pad 17 (see FIG. 2) with its end portions 38 extending past their ends. The base 14 further includes an elongate retaining member 40 (e.g., also an extrusion of rigid polyvinyl chloride or polystyrene) comprising a tensioning portion 42 within and extending along the elongate recess 36 with a portion of the outer layer 26 between the tensioning portion,42 and the support plate 28 (see FIG. 6) to tension the outer layer 26.across the top surface 20 of the pad 17. Means (not shown) in the form of a layer of adhesive impregnating and on both sides of the outer layer 26, or ultrasonic welding, or screws, or rivets, or pins, or a friction fit between the tensioning portion 42 and the support plate 28 are provided for retaining the tensioning portion 42 within the elongate recess 36.

Figure 3:
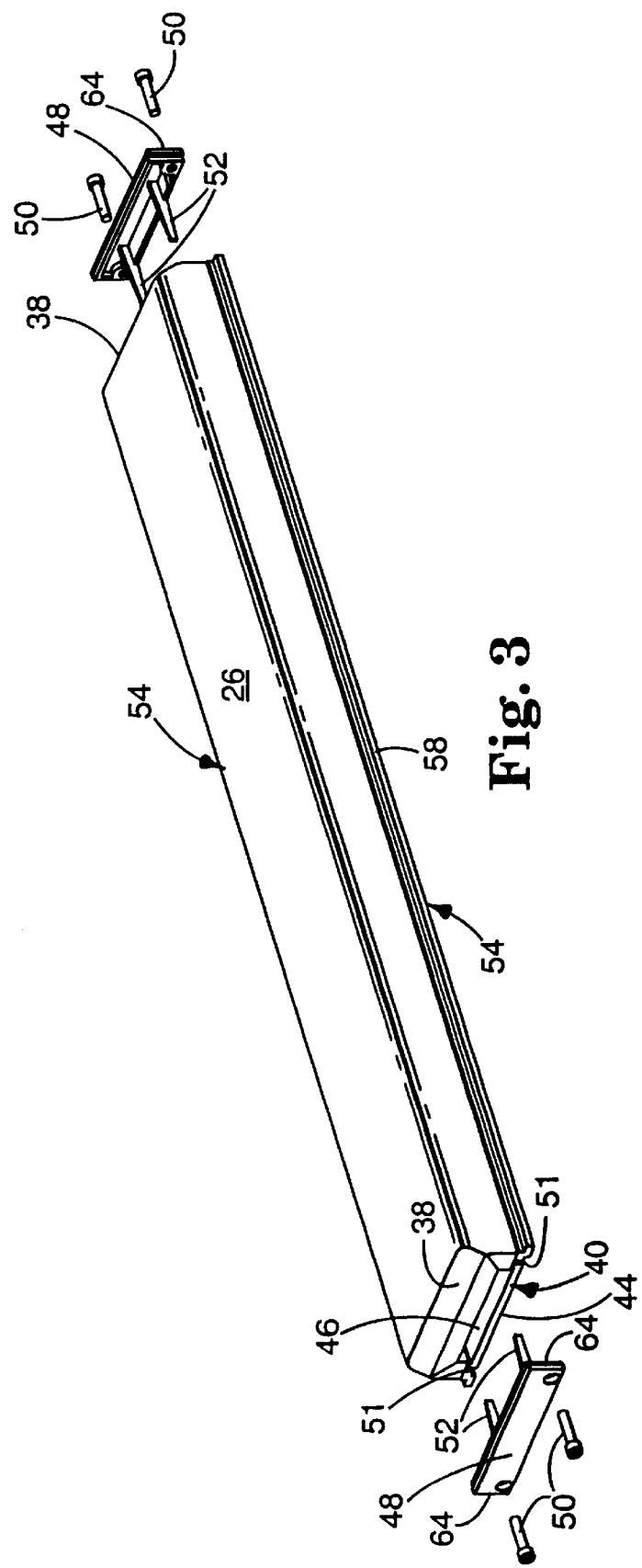

Means are also provided for retaining the end portions 38 of the sleeve or outer layer 26 around the ends 24 of the pad 17 (see FIG. 3). The retaining member 40 has opposite ends 44 at the ends 24 of the pad 17 and openings 46 into those ends 44. The end portions 38 of the sleeve of outer layer 26 that extend beyond the ends 24 of the pad 17 are positioned in the openings 46. The assembly 10 includes end caps 48 attached at the opposite ends 44 of the retaining member 40 by two self taping screws 50 extending through the end caps 48 and engaging openings 51 in the retaining member 40. The end caps 48 include projections 52 projecting into the openings 46 in the retaining member 40 that engage the end portions 38 of the outer layer 26 sleeve to provide the means for retaining those end portions 38 around the ends 24 of the pad 17.

Figure 4:
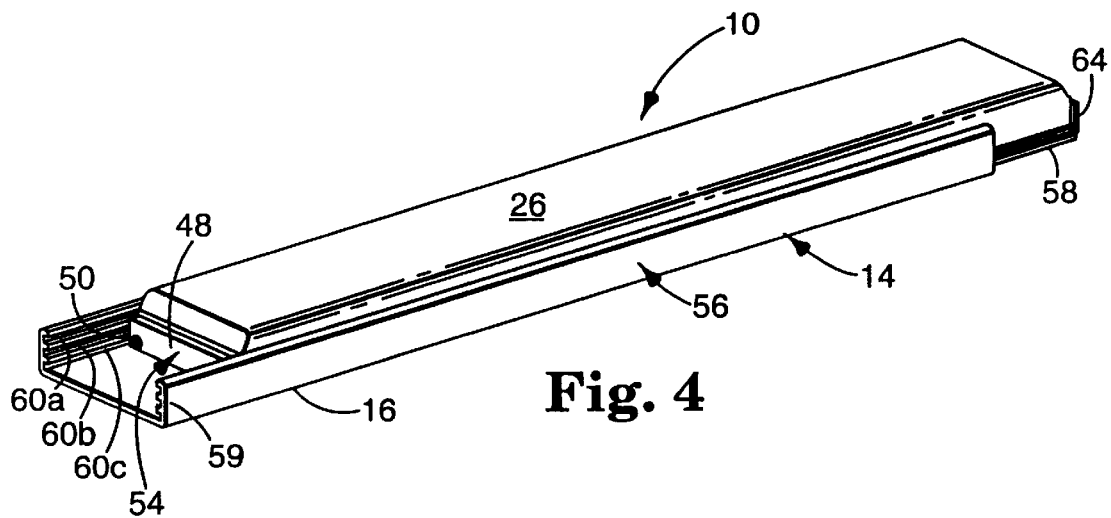

The support plate 28 and the retaining member 40 together provide a top portion 54 for the base 14 that has the upper pad support surface 15 supporting the bottom surface 21 of the elongate pad 17. The base 14 also includes a bottom portion 56 having the bottom supported surface 16 adapted to be supported on a horizontal surface; and, as is best seen in FIGS. 4 and 6, means are provided for supporting the top portion 54 on the bottom portion 56 with the top surface 20 of the elongate pad 17 at a desired predetermined one of several different distances above the bottom surface 16. Those means are provided in that the top portion 54 of the base 14 comprises longitudinally extending rails 58 on the retaining member 40 projecting outwardly in opposite directions generally parallel to its upper surface 15; and the bottom portion 56 of the base 14 includes generally parallel spaced vertically upwardly projecting support portions 59 having opposed surfaces defining sets of horizontal grooves 60a, 60b and 60c vertically spaced along the support portions 59. Each of the sets of grooves 60a, 60b or 60c is adapted to slidably receive the rails 58 to support the top surface 20 of the pad 17 on the top portion 54 at a different distance above the bottom supported surface 16. Thus, the top portion 54 of the base 14 can be slid longitudinally of its bottom portion 56 to disengage the rails 58 from one set of the grooves 60a, 60b or 60c with which they are engaged, and subsequently engaged with a different set of the grooves 60a, 60b or 60c to change the distance between the supported surface 16 and the top surface 20 of the pad as may be desirable to properly support a users wrists.

As can be seen in FIG. 5, the top and bottom portions 54 and 56 are both of about the same length, and the assembly 10 further includes means for releasably retaining the top portion 54 in the bottom portion 56 with the corresponding ends of the top and bottom portions 54 and 56 generally in alignment. That means comprises removable end covers 62 each adapted for engagement with an end of the top portion 54 and extending across and around the adjacent end of the bottom portion 56 so that the end of the top portion 54 with which the end cover 62 is engaged can not move further into the bottom portion 56. Engagement between each end cover 62 and an end of the top portion 54 is provided in that the end caps 48 have opposite outwardly projecting vertically extending tabs 64 (FIG. 3) at their ends adjacent the support portions 59, and the end covers 62 have opposed inwardly projecting vertically extending tabs 66 (FIG. 5) adapted to engage between the tabs 64 on the end caps 48 and the ends 44 of the retaining member 40 when the end cover 62 is slid vertically toward the supported surface 16 to the position illustrated in FIG. 5. With both end covers 62 engaged with the ends of the top and bottom portion 54 and 56 the top portion 54 cannot move in the bottom portion 56 in either direction, and thus is releasably retained in the bottom portion 56 with the corresponding ends of the top and bottom portions 54 and 56 generally in alignment.

With either or both of the end covers 62 removed, the top portion 54 can reciprocate along the bottom portion 56 by sliding movement of the rails 58 in the surfaces defining the grooves 60a, 60b or 60c with which they are engaged which affords removing the top portion 54 from the bottom portion 56 and re-engaging it with the rails 58 in a different set of grooves 60a, 60b or 60c to change the distance between the top surface 20 of the pad and the supported surface 16. Such reciprocation afforded by removing one or both of the end covers 62 might also provide advantages for some uses of the assembly 10 to affording large transverse movements of the wrists with the top portion 54 without relocating the wrists along the top surface 20 of the pad 17 (e.g., to move one hand from the typing keys to the numerical pad of a computer keyboard without lifting the wrists from the pad 17).

The present invention has now been described with reference to one embodiment thereof. It will be apparent to those skilled in the art that many changes can be made in the embodiment described without departing from the scope of the present invention. For example: the wrist rest assembly can be made any length; the pad support surface of the base could have shapes other than generally planar such as being arcuate around a longitudinal axis to make it, for example, cylindrically convex or concave, or could have transverse recesses below where a users wrists would normally be supported; the bottom portion 56 of the base could have more or less than three sets of grooves to provide larger or smaller ranges of adjustment; and the wrist rest assembly could further include a base plate attached along and having a portion projecting from the supported surface 16 of base, which projecting portion is adapted to support the device, such as those base plates 70, 71 or 72 illustrated in FIGS. 7, 8 and 9. Thus, the scope of the present invention should not be limited to the structure described in this application, but only by the structure described by the language of the claims and the equivalents thereof.

What is claimed is:

1. A wrist rest assembly comprising:
   a stable elastomeric block polymer gel layer, the gel layer being elongated longitudinally and having opposite longitudinally extending edges, opposite longitudinally spaced ends, a top surface for supporting a user's wrists, a bottom surface opposite the top surface, and a thickness between the top surface and the bottom surface, the gel layer extending between ends for a gel length and between edges for a gel width;
   a rigid base having a generally flat support surface extending the gel length and the gel width for supporting the gel layer, the base having longitudinally extending edge supports projecting upwardly from the support surface to a common height along the entire extent of each edge support, the edge supports extending adjacent the edges of the gel layer, and the base further including end supports which extend upwardly from the support surface adjacent the ends of the gel layer to terminate at a height, wherein the end supports are removably secured relative to the support surface;
   a support layer extending between the bottom surface of the gel layer and the support surface of the base; and
   a flexible cover layer extending over the gel layer and secured to the support layer, with the cover layer and support layer sealed together adjacent the ends of the gel layer;

wherein the top surface of the gel layer and the cover layer thereon extend above the common height of the edge supports and above the height of the end supports, and the gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane, and wherein such motion allows the user's wrists to move in any direction in a generally circular area having a diameter of at least one-half inch.

2. A wrist rest assembly comprising:

a stable elastomeric block polymer gel layer, the gel layer being elongated longitudinally and having opposite longitudinally extending edges, opposite longitudinally spaced ends, a top surface for supporting a user's wrists, a bottom surface opposite the top surface, and a thickness between the top surface and the bottom surface, the gel layer extending between ends for a gel length and between edges for a gel width;

a rigid base having a generally flat support surface extending the gel length and the gel width for supporting the gel layer, the base having longitudinally extending edge supports projecting upwardly from the support surface to a common height along the entire extent of each edge support, the edge supports extending adjacent the edges of the gel layer;

a support layer extending between the bottom surface of the gel layer and the support surface of the base;

a flexible cover layer extending over the gel layer and secured to the support layer, with the cover layer and support layer sealed together adjacent the ends of the gel layer; and an outer layer secured to the support layer to flexibly cover the top surface of the gel layer, wherein the top surface of the gel layer and the cover layer thereon extend above the height of the edge supports, and the gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane, and wherein such motion allows the user's wrists to move in any direction in a generally circular area having a diameter of at least one-half inch.

3. The wrist rest assembly of claim 2, wherein the flexible cover layer secures to the support layer by forming a sleeve around the support layer, and wherein the outer layer secures the flexible cover layer to the support layer.

4. A wrist rest assembly comprising:

a stable elastomeric block polymer gel layer, the gel layer being elongated longitudinally and having opposite longitudinally extending edges, opposite longitudinally spaced ends, a top surface for supporting a user's wrists, a bottom surface opposite the top surface, and a thickness between the top surface and the bottom surface, the gel layer extending between ends for a gel length and between edges for a gel width;

a rigid base having a generally flat support surface extending the gel length and the gel width for supporting the gel layer, the base having longitudinally extending edge supports projecting upwardly from the support surface to a common height along the entire extent of each edge support, the edge supports extending adjacent the edges of the gel layer, and the base having a top portion and a bottom portion, the top portion including the support surface and edge supports thereon, and further comprising:

a pair of longitudinally extending rails on the top portion; and a pair of upwardly projecting support portions on the bottom portion, the upwardly projecting support portions having a plurality of vertically spaced sets of grooves thereon, and each set of grooves being adapted to slidably receive the rails therein;

a support layer extending between the bottom surface of the gel layer and the support surface of the base; and a flexible cover layer extending over the gel layer and secured to the support layer, with the cover layer and support layer sealed together adjacent the ends of the gel layer;

wherein the top surface of the gel layer and the cover layer thereon extend above the height of the edge supports, and the gel layer has a sufficient thickness between the top and bottom surfaces thereof and a sufficient width between the edges thereof to have a portion of the gel layer beneath and conforming to the wrists supported on the top surface thereof and to afford significant motion of the top surface of the gel layer with the supported wrists relative to the bottom surface of the gel layer in a horizontal plane, and wherein such motion allows the user's wrists to move in any direction in a generally circular area having a diameter of at least one-half inch.

5. A wrist rest assembly comprising:

an elastomeric polymer gel layer, the gel layer being elongated longitudinally and having longitudinally extending edges, a top surface for supporting a user's wrists, a bottom surface opposite the top surface, and a thickness between the top surface and the bottom surface, the gel layer extending between the edges for a gel width;

a base having a generally flat support surface for supporting the gel layer along the bottom surface thereof, and the base having a top portion and a bottom portion, the top portion including the support surface, and the base further comprises:

a pair of longitudinally extending rails on the top portion; and a pair of upwardly projecting support portions on the bottom portion, the upwardly projecting support portions having a plurality of vertically spaced sets of grooves thereon, and each set of grooves being adapted to slidably receive the rails therein;

a support layer extending between the bottom surface of the gel layer and the support surface of the base; and a flexible cover layer extending over the gel layer and secured to the support layer to retain the gel layer therein, wherein the gel layer has a sufficient thickness between the top and bottom surfaces thereof and a sufficient width between the edges thereof to have a portion of the gel layer beneath and conforming to the user's wrist supported on the top surface thereof and to afford motion of the top surface of the gel layer with the user's supported wrist relative to the bottom surface of the gel layer in a plane generally parallel to the support surface, and wherein such motion allows the user's supported wrist to move in any direction in a generally circular area having a diameter of at least one half inch.

6. A wrist rest comprising:

a non-liquid elastomeric polymer gel layer, the gel layer being elongated longitudinally and having opposed, spaced apart side edges to define a gel layer width therebetween, a top surface for supporting a user's wrist, and a bottom surface spaced from the top surface to define a gel layer thickness therebetween, wherein the width and thickness of the gel layer are sufficient to have a portion of the gel layer beneath and conforming to the user's wrist supported on the top surface thereof and to afford motion of the top surface of the gel layer with the user's supported wrist relative to the bottom surface of the gel layer in a plane generally parallel to the support surface, and wherein such motion allows the user's supported wrist to move in any direction in a generally circular area having a diameter of at least one-half inch; and a base for supporting the gel layer along the bottom surface thereof, the base having a top portion and a bottom portion, and further comprising:

a generally flat support surface on the top portion of the base for supporting the gel layer along the bottom surface of the gel layer;

a pair of longitudinally extending rails on the top portion; and a pair of upwardly projecting support portions on the bottom portion, the upwardly projecting support portions having a plurality of vertically spaced sets of grooves thereon, and each set of grooves being adapted to slidably receive the rails therein.

7. A wrist rest assembly comprising:

a pad assembly having an upper portion and a lower portion, the upper portion including a non-liquid elastomeric polymer gel layer, the gel layer being elongated longitudinally and having longitudinally extending side edges, laterally extending end edges, a top surface for supporting a user's wrist and a bottom surface, the gel layer extending between the longitudinal edges for a gel width, extending between the lateral edges for a gel length, and having a sufficient thickness between its top and bottom surfaces and a sufficient gel width to have a portion of the gel layer beneath and conforming to the user's wrist supported on the top surface thereof, and the gel layer affording motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch, and the lower portion having a top surface and a bottom surface, the top surface of the lower portion supporting the bottom surface of the gel layer and the bottom surface of the lower portion being the bottom surface of the pad assembly, the lower portion having a width and a length generally conforming with the gel width and the gel length, respectively, the lower portion of the pad assembly being less compressible than the upper portion thereof, and the lower portion having edge sections extending along the bottom surface thereof laterally beyond the longitudinally extending side edges of the gel layer; and a base having a generally flat support surface for supporting the pad assembly along the bottom surface of the lower portion thereof and longitudinally extending edge supports projecting upwardly from the support surface to a common height along and above the entire extent of each edge section of the lower portion of the pad assembly.

8. The wrist rest assembly of claim 7, wherein the edge supports of the base have a plurality of vertically spaced projections thereon which are adapted to engage the edge sections on the lower portion of the pad assembly whereby the pad assembly and base may be assembled in a plurality of relative height configurations.

9. The wrist rest assembly of claim 8 wherein the projections are adapted to slidably receive the edge sections thereon.

10. The wrist rest assembly of claim 7 wherein an upper outer edge of each edge support is rounded.

11. The wrist rest assembly of claim 7 wherein the base has a device support portion projecting therefrom which is adapted to support an input device to be operated by a user's hands or fingers.

12. The wrist rest assembly of claim 7 wherein an upper outer edge of each edge support is rounded.

13. In a wrist rest assembly of the type having an elongated resilient pad which has a cover thereon and which is supported by and separable from an elongated pad mounting structure, the improvement which comprises:

the resilient pad having an upper pad portion and a lower pad support portion, the upper pad portion including a non-liquid elastomeric polymer gel layer, the gel layer being elongated longitudinally and having longitudinally extending side edges and laterally extending end edges, a top surface for supporting a user's wrist and a bottom surface, the gel layer extending between the longitudinal edges to define a gel width, extending between the lateral edges to define a gel length, and having a sufficient thickness between its top and bottom surfaces and a sufficient gel width to have a portion of the gel layer beneath and conforming to the user's wrist supported on the top surface thereof, and the gel layer affording motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least onehalf inch, and the lower pad support portion having a top surface and a bottom surface, the top surface of the lower pad support portion supporting the bottom surface of the gel layer and the bottom surface of the lower pad support portion being the bottom surface of the resilient pad, the lower pad support portion having a width and a length generally conforming with the gel width and the gel length, respectively, and the lower pad support portion having edge sections extending laterally beyond the longitudinally extending side edges of the gel layer; and the elongated pad mounting structure having a support surface for supporting the resilient pad along the bottom surface of the lower pad support portion thereof and longitudinally extending edge supports projecting upwardly from the support surface to a common height along and higher than the entire extent of each edge section of the lower pad support portion of the resilient pad, and the elongated pad mounting structure being in engagement with only the lower pad support portion of the resilient pad.

14. The improvement of claim 13 wherein the elongated pad mounting structure is formed from a rigid material.

15. The improvement of claim 13 wherein the lower pad support portion of the resilient pad is less compressible than the upper pad portion thereof.

16. The improvement of claim 13 wherein the edge supports of the elongated pad mounting structure have a plurality of vertically spaced projections thereon which are adapted to engage the edge sections on the lower pad support portion of the resilient pad whereby the resilient pad and the elongated pad mounting structure may be assembled in a plurality of relative height configurations.

17. The improvement of claim 16 wherein the projections are adapted to slidably receive the edge sections thereon.

18. The improvement of claim 13 wherein the base has a device support portion projecting therefrom which is adapted to support an input device to be operated by a user's hands or fingers.

19. The improvement of claim 13 wherein the generally circular area has a diameter of about one inch.

20. In a wrist rest assembly of the type having an elongated resilient pad which has a cover thereon and which is supported by and separable from an elongated pad mounting structure, the improvement which comprises:

the resilient pad having an upper pad portion and a lower pad support portion, the upper pad portion including a non-liquid elastomeric polymer gel layer, the gel layer being elongated longitudinally and having longitudinally extending side edges and laterally extending end edges, a top surface for supporting a user's wrist and a bottom surface, the gel layer extending between the longitudinal edges to define a gel width, extending between the lateral edges to define a gel length, and having a sufficient thickness between its top and bottom surfaces and a sufficient gel width to have a portion of the gel layer beneath and conforming to the user's wrist supported on the top surface thereof, and the gel layer affording motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch, and the lower pad support portion having a top surface and a bottom surface, the top surface of the lower pad support portion supporting the bottom surface of the gel layer and the bottom surface of the lower pad support portion being the bottom surface of the resilient pad, the lower pad support portion having a width and a length generally conforming with the gel width and the gel length, respectively, and the lower pad support portion having edge sections extending laterally beyond the longitudinally extending side edges of the gel layer; and the elongated pad mounting structure having a support surface for supporting the resilient pad along the bottom surface of the lower pad support portion thereof, longitudinally extending edge supports projecting upwardly from the support surface to a common height along and higher than the entire extent of each edge section of the lower pad support portion of the resilient pad, and laterally extending ends aligned to extend above the support surface adjacent the end edges of the upper pad portion, with each end having no portion thereof extending over any part of the upper pad portion of the resilient pad and the cover thereon, and the elongated pad mounting structure being in engagement with only the lower pad support portion of the resilient pad.

21. In a wrist rest of the type having an elongated resilient pad, wherein the resilient pad includes a layer of cushioning material with a cover thereover, and wherein the resilient pad is placed on a horizontal surface adjacent an input device to be operated by a person's hand or fingers, the improvement which comprises:

the resilient pad having an upper pad portion and a lower pad support portion, the upper pad portion including the cover and the cushioning material is defined as a non-liquid elastomeric polymer gel layer, the gel layer being elongated longitudinally and having longitudinally extending side edges and laterally extending end edges, a top surface for supporting the cover which engages a user's wrist and a bottom surface, the gel layer extending between the longitudinal edges to define a gel width, extending between the lateral edges to define a gel length, and having a sufficient thickness between its top and bottom surfaces and a sufficient gel width to have a portion of the gel layer beneath and conforming to the user's wrist supported by the cover on the top surface thereof, and the gel layer affording motion of the top, surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch, and the lower pad support portion having a top surface and a bottom surface, the top surface of the lower pad support portion supporting the bottom surface of the gel layer and the bottom surface of the lower pad support portion being the bottom surface of the resilient pad, the lower pad support portion having a width and a length generally conforming with the gel width and the gel length, respectively, and the lower pad support portion having edge sections extending laterally beyond the longitudinally extending side edges of the gel layer.

22. The improvement of claim 21 wherein the generally circular area has a diameter of about one inch.

23. In a wrist rest of the type having an elongated resilient pad, wherein the resilient pad includes a layer of cushioning material with a cover thereover, and wherein the resilient pad is placed on a horizontal surface adjacent an input device to be operated by a person's hand or fingers, the improvement which comprises:

the resilient pad having an upper pad portion and a lower pad support portion, the upper pad portion including the cover and the cushioning material is defined as a non-liquid elastomeric polymer gel layer, the gel layer being elongated longitudinally and having longitudinally extending side edges and laterally extending end edges, a top surface for supporting the cover which engages a user's wrist and a bottom surface, the gel layer extending between the longitudinal edges to define a gel width, extending between the lateral edges to define a gel length, and having a sufficient thickness between its top and bottom surfaces and a sufficient gel width to have a portion of the gel layer beneath and conforming to the user's wrist supported by the cover on the top surface thereof, and the gel layer affording motion of the top surface of the gel layer with the user's supported wrist relative to the bottom surface of the gel layer in a plane generally parallel to the bottom surface, wherein such motion allows the user's supported wrist to move in any direction in a generally circular area having a diameter of at least one-half inch, and the lower pad support portion having a top surface and a bottom surface, the top surface of the lower pad support portion supporting the bottom surface of the gel layer and the bottom surface of the lower pad support portion being the bottom surface of the resilient pad, the lower pad support portion having a width and a length generally conforming with the gel width and the gel length, respectively, the lower pad support portion of the resilient pad being less compressible than the upper pad portion thereof, and the lower pad support portion having edge sections extending laterally beyond the longitudinally extending side edges of the gel layer.

* * * * *